United States Patent [19]

McFetridge et al.

[11] Patent Number: 4,780,763

[45] Date of Patent: Oct. 25, 1988

[54] VIDEO SPECIAL EFFECTS APPARATUS

[75] Inventors: Grant T. McFetridge, Nevada City; Randy K. Hall, Penn Valley, both of Calif.

[73] Assignee: The Grass Valley Group, Inc., Grass Valley, Calif.

[21] Appl. No.: 32,141

[22] Filed: Mar. 27, 1987

[51] Int. Cl.[4] .............................................. H04N 5/272

[52] U.S. Cl. ........................................ 358/183; 358/22

[58] Field of Search ........................... 358/183, 181, 22

[56] References Cited

U.S. PATENT DOCUMENTS 4,527,201 7/1985 Cappels .............................. 358/183

*Primary Examiner*—Tommy P. Chin

*Attorney, Agent, or Firm*—Francis I. Gray; John Smith-Hill

[57] ABSTRACT

A wipe-only effects apparatus has a video mixer with video input terminals for receiving respective input video signals. The mixer combines the input video signals in dependence upon a control signal received at a control input terminal of the mixer. A ramp generator a repetitive ramp signal and applies it to a control input terminal of the video mixer as the control signal. The repetitive ramp signals start at the beginning of the active picture interval of a video field and terminate at a position determined by an operator controlled knob. The transition from one video signal to the other is caused by decreasing the slope of the repetitive ramp signal to zero.

5 Claims, 2 Drawing Sheets

FIG. 2(a)
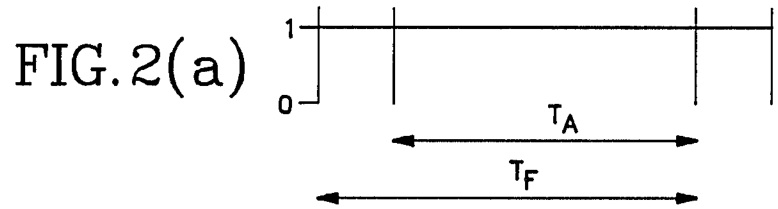
FIG. 2(b)
FIG. 2(c)
FIG. 2(d)
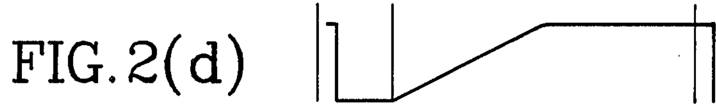
FIG. 2(e)
FIG. 2(f)
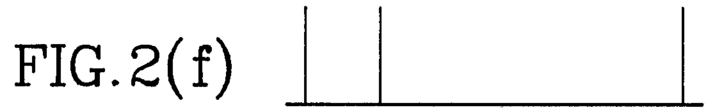
FIG. 3
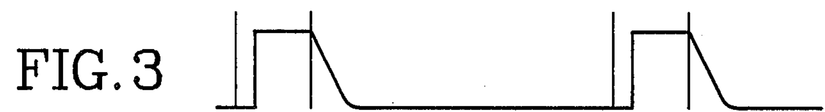

VIDEO SPECIAL EFFECTS APPARATUS

This invention relates to video special effects apparatus.

BACKGROUND OF THE INVENTION

A conventional video production switcher receives several input video signals and combines them under control of one or more control signals to generate an output video signal. For example, the switcher might receive two full-field program video signals and two full-field matte signals and the control functions might enable the output video signal to be formed by placing a portion of the scene represented by video 1 into a selected area of the scene represented by video 2, or replacing the background of the video 1 scene with matte 1 or matte 2. In the conventional production switcher, each mixing function is accomplished using a video mixer which receives two video signals (either or both of which might be matte signal) and a control signal. If the video signals received by the mixer are video 1 and matte 1 and the control signal is control 1, and the dynamic range of each signal is limited to 1 volt within the active line interval, then the voltage of the mixer's output video signal during the active line interval is $$\text{video } 1 \times \text{control } 1 + \text{matte } 1\,(1 - \text{control } 1)$$

For the sake of simplicity, a reference hereinafter to a video or matte signal may include not only the signal itself but also the scene represented by the signal.

Because a wide range of effects can be carried out using a production switcher, the waveforms of the control signals that are applied to the mixers of a production switcher are potentially very complex.

One of the effects that can be accomplished using a production switcher is a vertical wipe. When an input signal representing a first scene is wiped vertically to an input signal representing a second scene, the scene represented by the output signal changes from the first scene to the second scene over several frames, and the transition between scenes is horizontal. A vertical wipe is accomplished using a control signal of which the voltage level remains essentially constant during any one line interval, the voltage level being 1 volt at one edge of the frame, e.g. the upper edge, being 0 volts at the opposite (lower) edge of the frame, and having a linear transition between 1 volt and 0 volts over a few lines at a vertical level that progresses from top to bottom of the screen. In the region within which the control signal changes from 1 volt to 0 volts, the two video signals are mixed in linear fashion.

The vertical wipe is a relatively simple effect, but carrying out a vertical wipe using a conventional production switcher uses substantialy mixing resources of the switcher, and therefore precludes use of the switcher to carry out more complex and demanding effects.

SUMMARY OF THE INVENTION

A preferred embodiment of the present invention is a wipe-only effects apparatus which comprises a video mixer having video input terminals for receiving respective input video signals. The mixer combines the input video signals in dependence upon a control signal received at a control input terminal of the mixer. A ramp generator generates a repetitive ramp signal and applies it to a control input terminal of the video mixer as the control signal.

BRIEF DESCRIPTION OF THE DRAWINGS

For a better understanding of the invention, and to show how the same may be carried into effect, reference will now be made, by way of example, to the accompanying drawings in which:

FIG. 3 shows a waveform for explaining other modes of operation of the apparatus.

DETAILED DESCRIPTION

Figure 1:
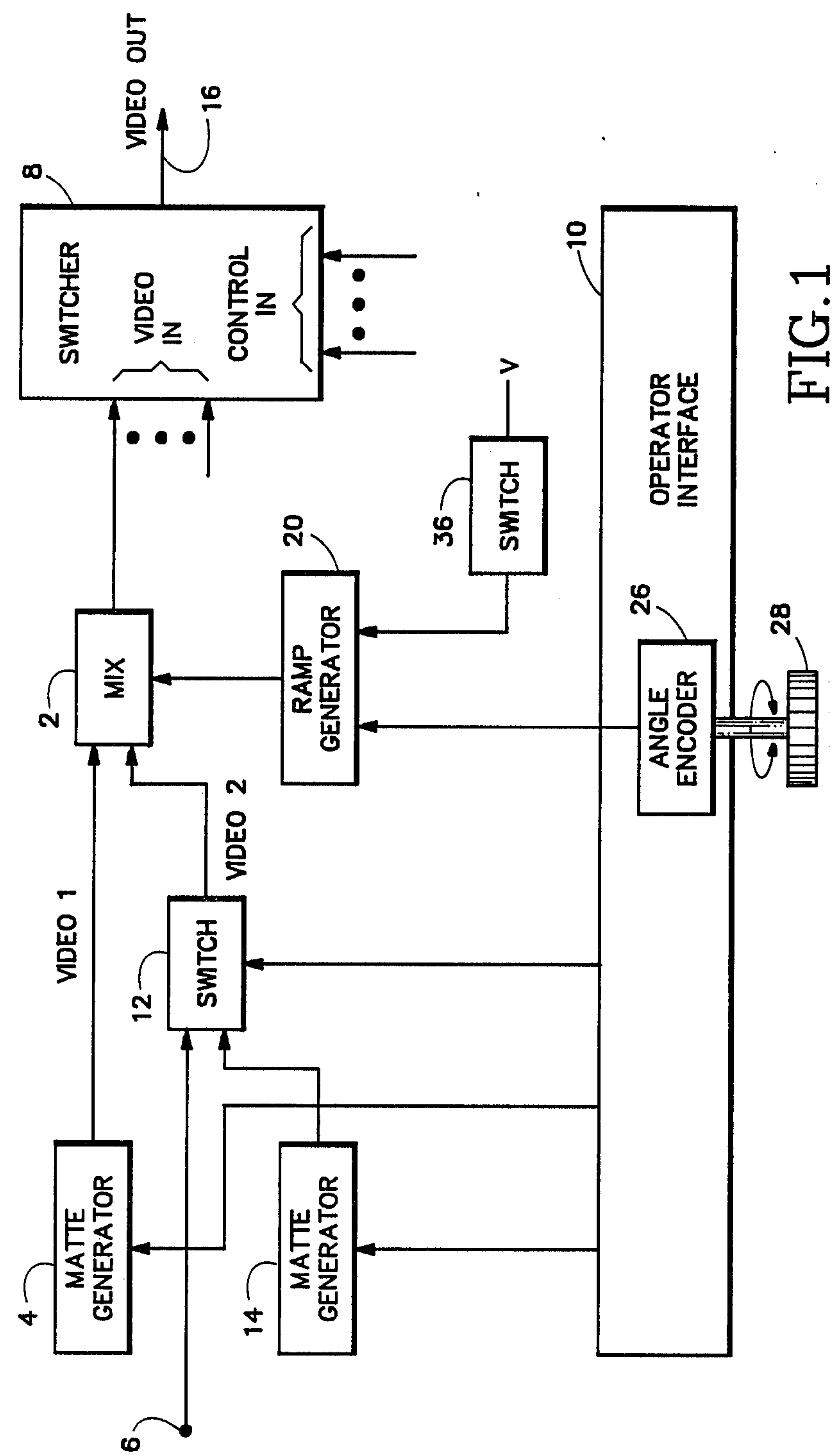
FIG. 1 is a block diagram of video special effects equipment including a wipe-only effects apparatus embodying the present invention, FIGS. 2(*a*) to 2(*f*) show waveforms for explaining the operation of the wipe-only effects apparatus.

The illustrated special effects equipment comprises a production switcher 8 and a video mixer 2. The mixer 2 receives two input video signals (video 1 and video 2) from respective signal sources and provides a background wash video signal to the production switcher. Video 1 is provided by matte generator 4 which generates a signal representing a color selected by the operator of the apparatus through an operator interface 10. Depending on the state of a switch 12, video 2 may be a black burst signal, i.e. a signal containing only sync and burst and therefore representing the color black, or a signal generated by a second matte generator 14 and representing a second operator-selected color. Each of the matte generators 4 and 14 may be of the form shown in co-pending Application Ser. No. 032,140, filed Mar. 27, 1987 by Grant T. McFetridge entitled "Video Matte Generator", the disclosure of which is hereby incorporated by reference herein. The video signals that are applied to the mixer 2 are synchronized with each other in the manner described in the co-pending application. In FIG. 2(*a*), the duration of a field of the background signal provided by the mixer 2 is represented by $T_F$, while $T_A$ represents the active picture interval of the field. The production switcher receives the background wash signal and other video signals from various other sources (not shown) and combines its input video signals under control of signals provided by the operator interface 10 to generate an output video signal at a terminal 16. The output video signal may be applied to a videotape recorder or other utilization device (not shown).

The mixer 2 combines the video 1 and video 2 signals in response to a wipe control signal provided by a ramp generator 20. A ramp rate signal is provided by an angle encoder 26 in dependence upon the angular position of a control knob 28 and defines a line within a field of the background signal. As the control knob is rotated from a start position to an end position, the line defined by the ramp rate signal sweeps through the field from one vertical blanking interval to the next. The ramp generator receives a ramp start signal from a switch 36.

For the purpose of the following description, it will be assumed that the wipe is from 100% video 1 to 100% video 2, and that the wipe starts at the top of the scene represented by the output signal of the mixer 2. It will also be assumed that in order to increase the contribution of video 2 to the output signal, the voltage of the wipe control signal received by the mixer 2 must decrease.

Based on the foregoing assumptions, before the wipe is initiated the line defined by the ramp rate signal is within the blanking interval of the current field and the voltage of the wipe control signal is 1 v over the entire field (FIG. 2(*a*)). In order to accomplish the desired wipe, control knob 28 is rotated so that the ramp rate signal defines a line that is within the active interval of the field. The voltage level of the wipe control signal is brought to 0 v during the vertical interval. The switch 36 is triggered by the vertical sync signal and starts the ramp generator at the start of the active interval. The voltage of the wipe control signal increases monotonically from 0 v and reaches 1 v on the line defined by the ramp rate signal (FIG. 2(*b*)). As the voltage of the wipe control signal increases, the relative contributions of video 1 and video 2 to the output signal provided by the mixer 2 change.

By smoothly rotating the control knob through its range of movement, the operator is able to cause the line defined by the ramp rate signal to sweep smoothly forwards from the first line of the field. As the line advances relative to the beginning of the current field, the slope of the ramp decreases (FIGS. 2(*c*)–2(*f*)) to zero, at which point the output signal of the mixer 2 is 100% video 2.

In order to wipe back to video 1, the video inputs of the mixer 2 may be switched or the wipe control signal may be inverted (FIG. 3).

If mixing of two video signals is controlled using a ramp signal having a simple linear waveform, with a dicontinuity in slope at the end that occurs later in time, i.e. at 1 v in the case of a ramp increasing from 0 v to 1 v and at 0 v in the case of a ramp decreasing from 1 v to 0 v, objectionable visual effects may be observed. It is therefore desirable that the ramp generator not generate a simple linear ramp but a ramp having smooth transitions to zero slope at the end that occurs later in time if that end of the ramp occurs within the active interval of the field. The ramp circuit may be of the form shown in patent application Ser. No. 795,676, filed Nov. 6, 1985, by Paul M. Trethewey entitled "Apparatus for Smoothing an Abrupt Change in Signal Level" the disclosure of which is hereby incorporated by reference herein.

By use of the illustrated wipe-only effects apparatus, it is possible to generate at the output of the mixer a video signal representing a fade from the color represented by the signal provided by the source 4 to black or to another color, represented by the signal provided by the matte generator 14. This commonly-used video background signal is generated without using the mixing resources of the switcher 8.

It will be appreciated that the present invention is not restricted to the particular embodiment that has been described and illustrated, and that variations may be made therein without departing from the scope of the invention as defined in the appended claims and equivalents thereof. For example, the invention is not restricted to wipe-only apparatus that is only capable of performing a vertical wipe, and may be applied also to wipe-only apparatus that is capable of performing only a horizontal wipe or both a horizontal wipe and a vertical wipe, either simultaneously or sequentially. If the apparatus is capable of performing both a horizontal wipe and a vertical wipe, separate vertical and horizontal ramp generators may be required.

We claim:

1. Wipe-only effects apparatus, comprising:

a video mixer having first and second video input terminals for receiving first and second input video signals respectively and also having a video output terminal and a control input terminal, the mixer being operative to provide an output video signal from the first and second input video signals, combined in dependence upon a control signal applied to the control input terminal, and a ramp generator for generating a ramp signal having a repetitive start point and a variable end point and applying the ramp signal to the control input terminal of the video mixer as the control signal, the slope of the ramp signal being a function of a ramp control signal defining the variable end point, so as to cause the output video signal to wipe from the first to the second input video signal.

2. An apparatus according to claim 1, wherein the first and second input video signals each convey picture information during a succession of active picture intervals and the ramp generator is operative to generate a ramp signal without slope discontinuities within the active picture intervals of the first and second input video signals.

3. Apparatus according to claim 1, wherein the first and second input video signals are each composed of a succession of fields, each field being composed of a succession of line intervals, and wherein the ramp generator is operable to generate a ramp signal having a transition from a first voltage level to a second voltage level over an interval having the duration of several line intervals of the first and second input video signals.

4. Apparatus according to claim 1, wherein the first and second input video signals are each composed of a succession of fields, each field being composed of a succession of line intervals and each line interval having a blanking interval and an active picture interval, and wherein the ramp generator is operable to generate a ramp signal having a transition from a first voltage level to a second voltage level over an interval that is substantially shorter than the active picture interval of the first and second input video signals.

5. Video special effects equipment comprising:

a video mixer having first and second video input terminals for receiving first and second input video signals respectively, and also having a video output terminal and a control input terminal, the mixer being operative to provide an output video signal from the first and second input video signals, combined in dependence upon a control signal applied to the control input terminal, a ramp generator for generating a ramp signal having a repetitive start point and a variable end point and applying the ramp signal to the control input terminal of the video mixer as the control signal, the slope of the ramp signal being a function of a ramp control signal defining the variable end point, so as to cause the output video signal to wipe from the first to the second input video signal, and a production switcher having an input terminal connected to the video output terminal of the video mixer and also having at least one other input terminal for receiving a video signal, a video output terminal for providing a switcher output video signal and at least one switcher control input terminal for receiving a switcher control signal.

* * * * *